Dec. 20, 1966 D. K. SKOOG ETAL 3,292,369
IMPULSE TOOL

Original Filed Dec. 12, 1962 6 Sheets-Sheet 1

INVENTORS
DONALD K. SKOOG
CHRISTOPHER K. BROWN

Dec. 20, 1966   D. K. SKOOG ETAL   3,292,369
IMPULSE TOOL

Original Filed Dec. 12, 1962   6 Sheets-Sheet 3

INVENTORS
DONALD K. SKOOG
CHRISTOPHER K. BROWN

INVENTORS
DONALD K. SKOOG
CHRISTOPHER K. BROWN

INVENTORS
DONALD K. SKOOG
CHRISTOPHER K. BROWN

United States Patent Office 3,292,369
Patented Dec. 20, 1966

3,292,369
IMPULSE TOOL
Donald K. Skoog, Mountainside, N.J., and Christopher K. Brown, Sayre, Pa., assignors to Ingersoll-Rand Company, New York, N.Y., a corporation of New Jersey
Original application Dec. 12, 1962, Ser. No. 244,151, now Patent No. 3,210,961, dated Oct. 12, 1965. Divided and this application Nov. 22, 1963, Ser. No. 346,055
6 Claims. (Cl. 60—54.5)

The present invention relates to power tools of the type disclosed in U.S. patent application, Serial No. 115,714, filed June 8, 1961 by D. K. Skoog and entitled Power Tool, and more particularly to an improved impulse tool of this type. This application is a divisional application of United States patent application, Serial No. 244,151, filed December 12, 1962, by Donald K. Skoog et al. and titled Impulse Tool, now Patent No. 3,210,961, issued October 12, 1965.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satisfy the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

Another object of the present invention is the provision of a tool operable as a source of impulses, which impulses can be utilized to drive a conventional reciprocating tool, such as a hammer, or a conventional rotary tool, such as a drill.

A further object of the present invention is the provision of an impulse tool which is operable to apply a torque or a series of impulses at an angle with respect to the longitudinal axis of the impulse tool.

Yet another object of the present invention is to provide an impulse tool capable of delivering two impulses during each revolution of the driven means.

A further object of the present invention is to provide a through blade type impulse tool which eliminates the use of springs and provides one or more impulses during each revolution of the driven means.

A still further object of the present invention is to provide an impulse tool in which the springs and bypass slots are eliminated thus providing a stronger spindle and longer life for such spindle.

For a better understanding of the present invention reference should be had to the accompanying drawings, wherein like numerals of reference indicate similar parts throughout the several views and wherein.

Figure 4:
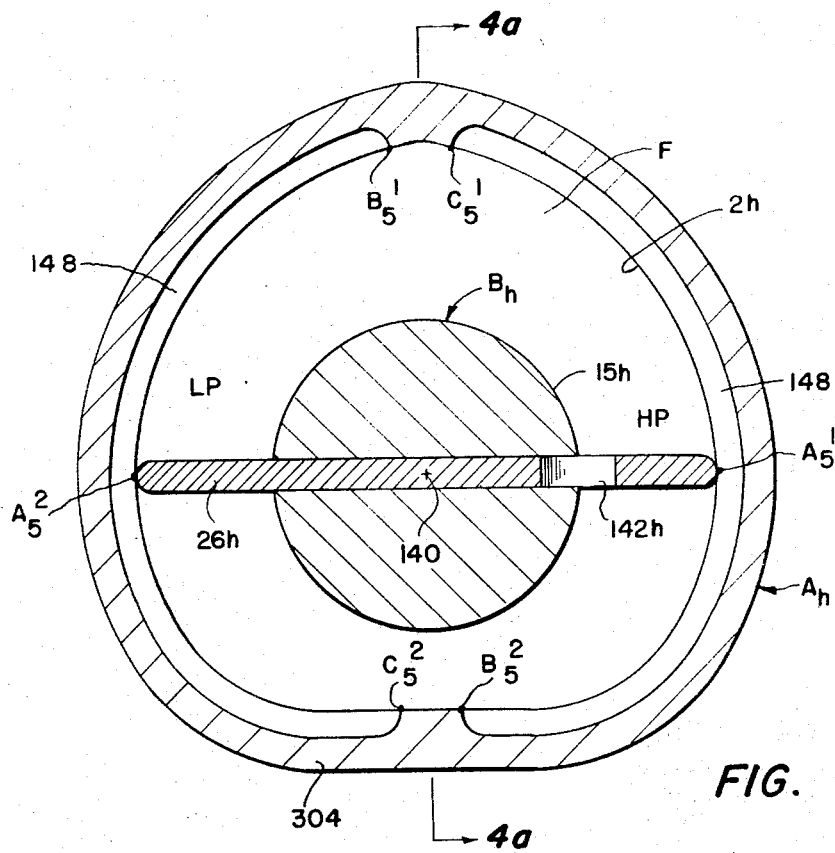
FIG. 4 is a view similar to FIGS. 2 and 3 of a further alternative embodiment of the Impulse Tool.
Figure 4F:
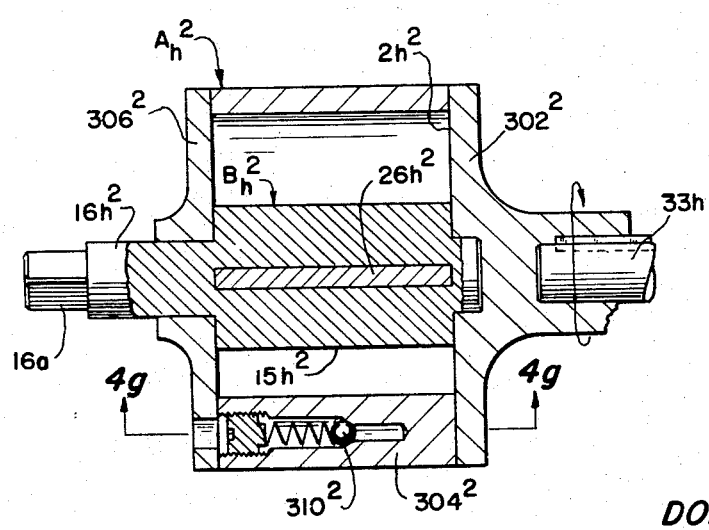
FIG. 4f is a view similar to FIG. 4a showing the housing means provided with pressure relief means.
Figure 4A:
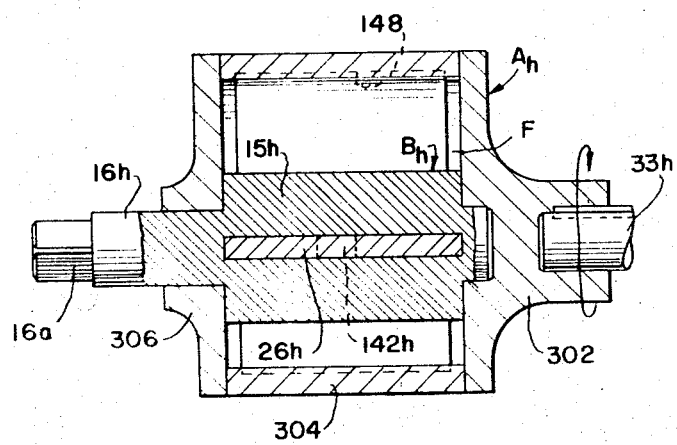
FIG. 4a is a vertical sectional view along the line 4a—4a of FIG. 4 in the direction of the arrows showing the housing means connected to the drive means and the spindle means connected to the square drive for the fastener socket.
Figure 4B:
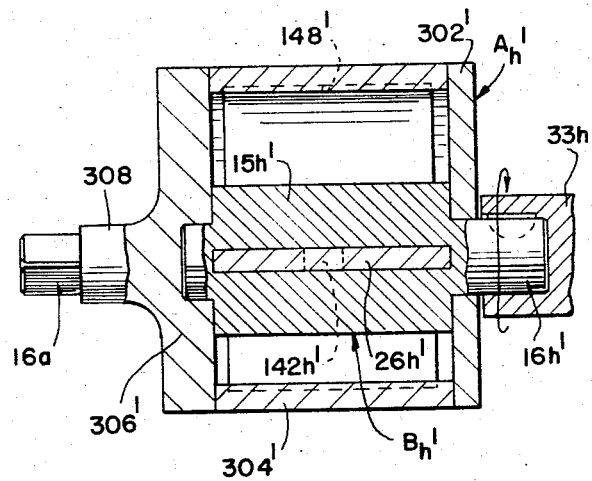
FIG. 4b is a view similar to FIG. 4a showing the spindle means connected to the drive means and the housing means connected to the square drive for the fastener socket.
Figure 4G:
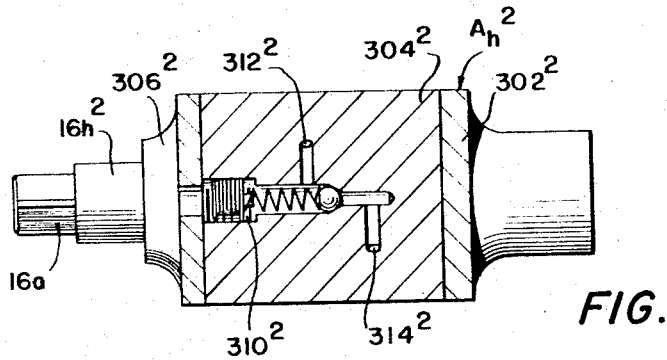
FIG. 4g is a vertical sectional view along the line 4g—4g of FIG. 4f in the direction of the arrows.
Figure 4H:
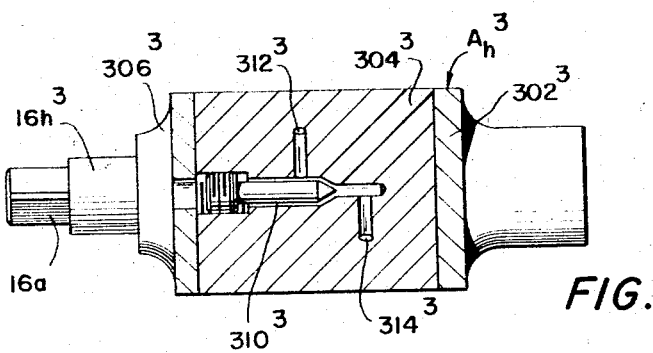
FIG. 4h is a view similar to FIG. 4g of an alternative embodiment.
Figure 4C:
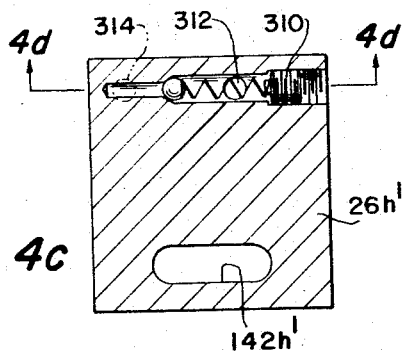
FIG. 4c is a vertical sectional view of a spindle blade similar to the one shown in FIG. 4 and provided with torque control means.
Figure 4E:
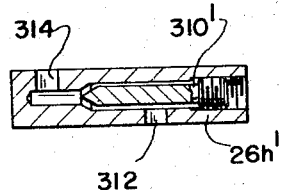
FIG. 4e is a view similar to FIG. 4d of an alternative embodiment.
Figure 4D:
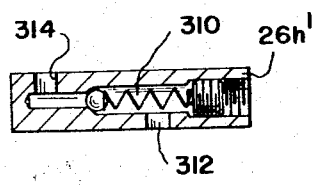
FIG. 4d is a vertical sectional view along the line 4d—4d of FIG. 4c in the direction of the arrows.
Figure 4I:
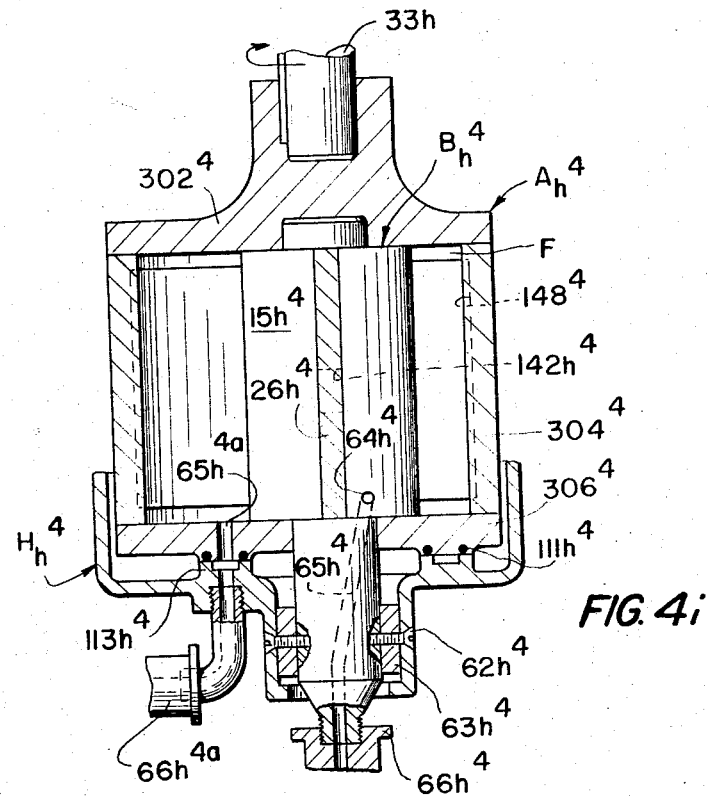
Figure 4J:
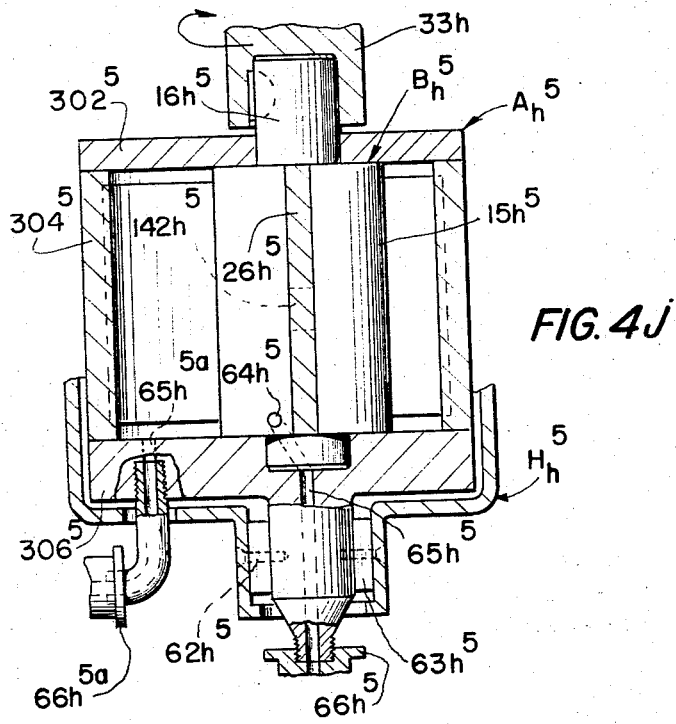

FIG. 4i is a view similar to FIG. 4a of apparatus for supplying fluid impulses and showing the spindle means tied to the casing means; the housing means utilized as the driven member; passage means in the spindle means, and alternatively the passage means in the housing means; and FIG. 4j is a view similar to FIG. 4i showing the housing means tied to the casing means; the spindle means as the driven member; passage means in the housing means; and alternatively the passage means in the spindle means.

The aforesaid objects of the present invention and other objects which will become apparent as the description proceeds are achieved by providing an impulse tool for applying a predetermined torque to an object. This impulse tool comprises housing means adapted to contain a fluid, a spindle means rotatable in the housing means and in the fluid adapted to engage the object, and drive means connected to the housing means for rotating the housing means with respect to the object and the spindle means. The spindle means is operable during a portion of each revolution of the housing means to dynamically seal off a portion of said fluid so that the pressure in the portion of the fluid and on the spindle means increases, thus causing the spindle means to rotate with respect to the housing means and to apply a torque to the object. Alternatively the spindle means is connected to the drive means and the housing means is adapted to engage the object. In addition, the spindle means is affixed to a stationary casing means and the impulses generated within the housing means are transmitted by means of passage means in the spindle means and through a flexible but rigid coupling means to a conventional tool. Alternatively the housing means is secured to the stationary casing means and the impulses are transmitted through passage means in the housing means.

The through-blade type impulse tool has through-blade type means carried by the spindle means and is engageable with the housing means. One of the housing means and the through-type blade means is provided with gating means for controlling the application of the predetermined torque.

While the impulse tool of the present invention may be advantageously employed for applying a torque to objects and as a source of fluid impulses in general, the impulse tool of the present invention is particularly adapted for use in conjunction with applying a torque to a threaded fastener and as a source of fluid impulses for driving a conventional tool and hence it has been so illustrated and will be so described.

Figure 1:
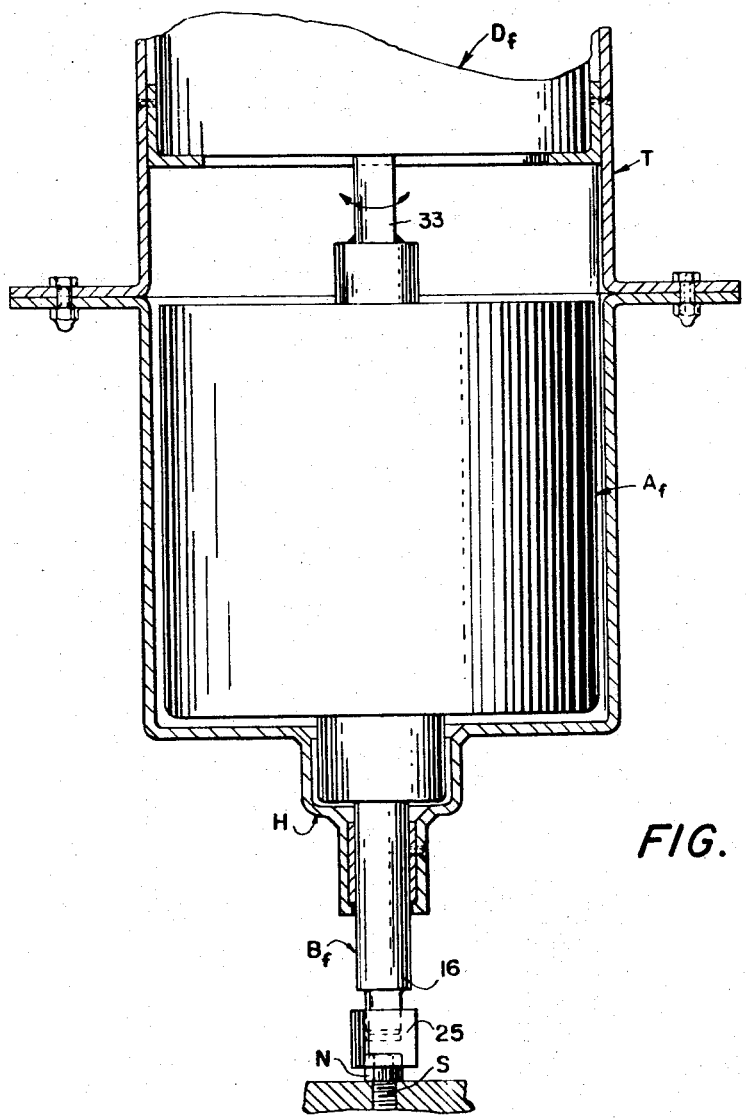
FIG. 1 is a side elevational view of the improved tool of the impulse type, shown in engagement with a threaded fastener and with a stationary casing means shown in vertical section.

With specific reference to the form of the present invention illustrated in the drawings, and referring particularly to FIG. 1, the impulse tool of the present invention is indicated generally by the reference letter T.

As shown in FIG. 1 this impulse tool T has a housing means $A_f$ provided with a cavity $2f$ adapted to contain a fluid, such as oil F, and driven by a drive means, such as the motor $D_f$, having an output shaft 33. A spindle means $B_f$ is rotatable in the housing means $A_f$ and in the oil F and has a front shaft portion 16 carrying a socket 25 adapted to engage an object, such as a nut N on a bolt S, to apply a predetermined torque throughout. The general operation of the impulse tool T is explained in Patent No. 3,116,617, issued to Donald K. Skoog on January 7, 1964.

Figure 2:
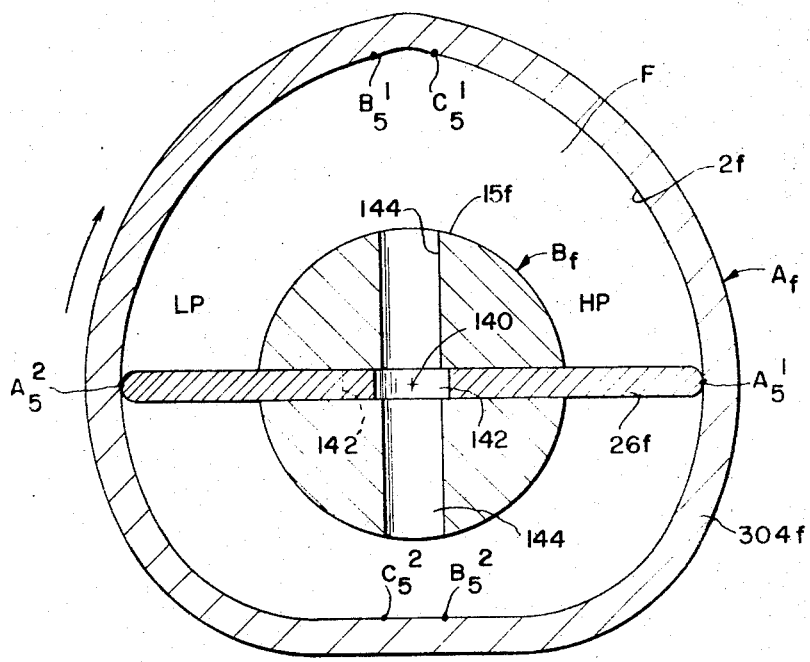
FIG. 2 is a horizontal sectional view of the through blade type Impulse Tool showing the housing means as the driven member.
Figure 3:
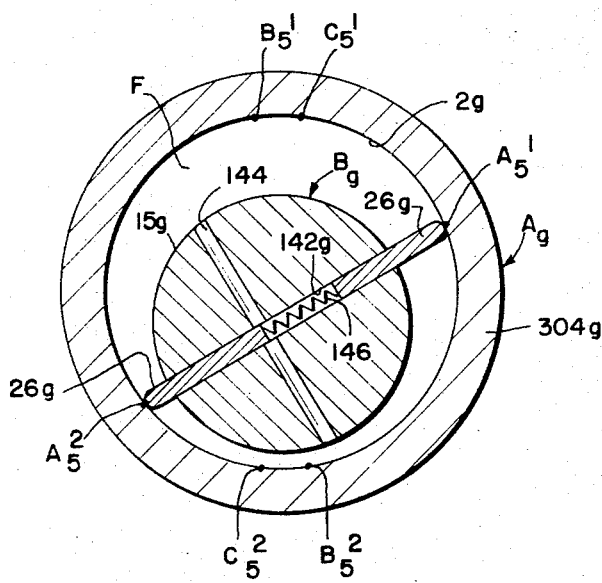
FIG. 3 is a view similar to FIG. 2 of an alternative embodiment of the Impulse Tool.

Referring to the specific form of the invention shown in FIGS. 2–4, through type blade means $26f$, $26g$ and $26h$ are carried by the spindle means $B_f$, $B_g$ and $B_h$, respectively. One of the housing means $A_f$, $A_g$, $A_h$ or the through type blade means $26f$, $26g$, $26h$ are provided with gating means 142, $142g$, $142h$, for controlling the application of the predetermined torque.

As shown in FIG. 2, the center of rotation of the housing means $A_f$ and the spindle $15f$ coincide at 140. The spindle $15f$ has a through type spindle blade $26f$ provided with a gating slot 142. In addition the cavity $2f$ is so contoured that the points $A_5^1$ and $A_5^2$ always ride without interference on the side wall of the cavity $2f$.

It will be understood that the spindle blade $26f$ need only contact the side wall of the cavity $2f$ in sealing engagement between points $B_5^1$ and $C_5^1$ and $B_5^2$ and $C_5^2$.

When, for example, the point $A_5^2$ rides between points $B_5^1$ and $C_5^1$ the oil F in the now sealed off high pressure section HP is compressed thereby applying an impulse to the spindle blade $26f$.

When $A_5^2$ rides between $B_5^2$ and $C_5^2$ the free flow of oil F through the by-pass slot 144 is shut off by the movement of the gating slot 142 out of registry and communication with such by-pass slot 144. There are obviously two such applied impulses for each revolution of the housing means $A_f$.

By increasing the length of the gating slot 142 (i.e., extending the left hand side wall, FIG. 1, to the dotted line position) only one impulse is achieved while $A_5^2$ is between $B_5^1$ and $C_5^1$. None occurs while $A_5^2$ is between $B_5^2$ and $C_5^2$.

Alternatively, (FIG. 3) the housing means $A_g$ has a circular cavity $2g$ and the spindle $15g$ is provided with two spindle blades $26g$ biased radially outward by means of a spring 146 in the gating slot $142g$, which gating slot $142g$ is formed by the space between the blades $26g$.

It will be understood that the blades $26g$ reciprocate in the spindle $15g$ as they follow the circular contour of the side wall of the cavity $2g$.

Referring to FIG. 4 it will be noted that the structural strength of the spindle $15h$ may be increased by eliminating the by-pass slot 144 of FIGS. 2 and 3 and utilizing by-pass slots 148 in the housing means $A_h$.

In order to make the Impulse Tool impulse once during each revolution of the housing means $A_h$, a secondary gating slot 142 may be provided. Thus an impulse is delivered when $A_5^2$ is between $B_5^1$ and $C_5^1$ but not when $A_5^2$ is between $B_5^2$ and $C_5^2$.

As shown in FIG. 4a, the housing means $A_h$ comprises back end plate 302, cylinder 304 and front end plate 306.

Referring to FIG. 4b, it will be understood that the spindle means $B_h^1$ may be connected to the output shaft $33h^1$ of a drive means, such as an air motor (not shown) as the driven member and that the housing means $A_h^1$ is connected by means of a housing shaft 308 to the square drive 16a.

In FIGS. 4c, 4d, 4e torque control means are provided in the spindle blade $26h^1$. It will be understood by those skilled in the art that spindle blades $26f$ (FIG. 2) and $26g$ (FIG. 3) may also be provided with this torque control means. As shown in FIGS. 4c, 4d, a low pressure passage 312 in the spindle blade $26h^1$ connects the low pressure portion LP of the cavity $2h$ (not shown in FIGS. 4c, 4d) through a pressure relief means, such as an adjustable spring loaded poppet valve 310 to a high pressure passage 314 communicating with the high pressure portion HP of the cavity $2h$. At maximum desired torque the poppet valve 310 opens, thereby preventing any further increase in the fluid pressure in the high pressure portion HP and any attendant increase in torque.

Alternatively, as shown in FIG. 4e, an adjustable needle valve $310^1$ may be employed to provide an adjustable leakage path between the high pressure portion HP and low pressure portion LP to control maximum torque on the fastener (not shown).

Alternatively, as shown in FIGS. 4f, 4g, 4h, the pressure relief means may be contained within the housing means. In FIGS. 4f, 4g, an adjustable spring loaded poppet valve $310^2$ is employed while in FIG. 4h an adjustable needle valve $310^3$ is utilized.

Referring to the apparatus for supplying fluid impulses shown in FIG. 4i, the spindle means $B_h^4$ is tied by means of screws $62h^4$ to the casing means $H_h^4$. The housing means $A_h^4$ is rotated by the drive means (not shown). The passage means comprises the inclined passageway $64h^4$ and vertical passageway $65h^4$ in the spindle means $B_h^4$. Alternatively for brevity of illustration FIG. 4i also shows the passage means (i.e., vertical passageway $65h^{4a}$) in housing means $A_h^4$, lug $111h^4$ and lug $113h^4$.

In FIG. 4j the housing means $A_h^5$ is tied by means of screws $62h^5$ to the casing means $A_h^5$. The spindle means $B_h^5$ is rotated by the drive means (not shown). The passage means comprises the vertical passageway $65h^{5a}$ in the housing means $A_h{}^5$. Alternatively for brevity of illustration FIG. 4j shows passage means (i.e., lateral passageway $64h^5$ and vertical passageway $65h^5$) in the spindle means $B_h{}^5$.

It will be understood by those skilled in the art that the above described alternative embodiment (FIGS. 2–4, 4a–4j) may be employed with the following already described embodiments of the Impulse Tool, described in United States Patent No. 3,116,617.

(1) the embodiment (FIGS. 1–13) where the drive means causes relative movement between the housing means and the spindle means, (2) the embodiment (FIGS. 1–12) where the housing means is rotated by the drive means, (3) the embodiment (FIG. 13) where the spindle means is rotated by the drive means.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool acts as a seal dynamically and as a valve statically; has all of the advantages of the stall type, clutch type and impact type tools and none of the disadvantages thereof; is lighter in weight and faster in operation than the tools of the stall type and clutch type. The present invention also contemplates the use of the impulse tool as a source of fluid impulses, which impulses can be utilized to drive a conventional reciprocating tool, such as a hammer, or a conventional rotary tool, such as a drill. The impulse tool is operable to apply a torque or a series of impulses at any desired angle with respect to the longitudinal axis of the impulse tool.

In addition a through-blade type impulse tool has been provided which eliminates the use of springs and provides one or more impulses during each revolution of the driven means.

While in accordance with the patent statutes one known embodiment of the present invention has been illustrated and described in detail, it is to be particularly understood that the invention is not limited thereto or thereby.

We claim:

1. Apparatus connected to a tool and for driving said tool by fluid impulses, said apparatus comprising
   (a) a stationary casing means,
   (b) housing means rotatable within said casing means and adapted to contain a fluid,
   (c) spindle means rotatably mounted in said housing means and in said fluid,
   (d) through blade-type means carried by said spindle means and engageable with said housing means, one of said housing means and said through blade-type means being provided with gating means for controlling said application of the predetermined torque, one of said spindle means and housing means being secured to said casing means, said spindle means being provided with passage means in communication with said housing means, extending through said spindle means and connected to said tool,
   (e) and drive means connected to the other of said housing means and said spindle means for causing rotation of said other with respect to said casing means,
   (f) said spindle means being operable during a portion of each revolution of the relative rotation to dynamically seal off a portion of said fluid so that the pressure in said portion of the fluid and on said spindle means increases thereby causing a pulse of fluid to flow through said passage means to said tool.

2. Apparatus connected to a tool and for driving said tool by fluid impulses, said apparatus comprising
   (a) a stationary casing means,
   (b) housing means rotatable within said casing means and adapted to contain a fluid,
   (c) spindle means rotatably mounted in said housing means and in said fluid and secured to said casing means,
   (d) through blade-type means carried by said spindle means and engageable with said housing means, one of said housing means and said through blade-type means being provided with gating means for controlling said application of the predetermined torque, said spindle means being provided with passage means in communication with said housing means, extending through said spindle means and connected to said tool,
   (e) and drive means connected to said housing means for rotating said housing means with respect to said spindle means and said casing means,
   (f) said spindle means being operable during a portion of each revolution of the rotation of said housing means to dynamically seal off a portion of said fluid so that the pressure in said portion of the fluid and on said spindle means increases thereby causing a pulse of fluid to flow through said passage means to said tool.

3. Apparatus connected to a tool and for driving said tool by fluid impulses, said apparatus comprising
   (a) a stationary casing means,
   (b) housing means rotatable within said casing means, adapted to contain a fluid and secured to said casing means,
   (c) spindle means rotatably mounted in said housing means and in said fluid, said spindle means being provided with passage means in communication with said housing means, extending through said spindle means and connected to said tool,
   (d) through blade-type means carried by said spindle means and engageable with said housing means, one of said housing means and said through blade-type means being provided with gating means for controlling said application of the predetermined torque,
   (e) and drive means connected to said spindle means for rotating said spindle means with respect to said housing means and said casing means,
   (f) said spindle means being operable during a portion of each revolution of the rotation of said spindle means to dynamically seal off a portion of said fluid so that the pressure in said portion of the fluid and on said spindle means increases thereby causing a pulse of fluid to flow through said passage means to said tool.

4. Apparatus connected to a tool and for driving said tool by fluid impulses, said apparatus comprising
   (a) a stationary casing means,
   (b) housing means rotatable within said casing means and adapted to contain a fluid,
   (c) spindle means rotatably mounted in said housing means and in said fluid,
   (d) through blade-type means carried by said spindle means and engageable with said housing means, one of said housing means and said through blade-type means being provided with gating means for controlling said application of the predetermined torque, one of said spindle means and said housing means being secured to said casing means, said housing means being provided with passage means in communication with said fluid, extending through said housing means and connected to said tool, (e) and drive means connected to the other of said housing means and said spindle means for causing rotation of said other with respect to said casing means, (f) said spindle means being operable during a portion of each revolution of the rotation of said other to dynamically seal off a portion of said fluid so that the pressure in said portion of the fluid and on said spindle means increases thereby causing a pulse of fluid to flow through said passage means to said tool.

5. Apparatus connected to a tool and for driving said tool by fluid impulses, said apparatus comprising (a) a stationary casing means, (b) housing means rotatable within said casing means and adapted to contain a fluid, (c) spindle means rotatably mounted in said housing means and in said fluid and secured to said casing means, (d) through blade-type means carried by said spindle means and engageable with said housing means, one of said housing means and said through blade-type means being provided with gating means for controlling said application of the predetermined torque, said housing means being provided with passage means in communication with said fluid, extending through said housing means and connected to said tool, (e) and drive means connected to said housing means for rotating said housing means with respect to said spindle means and said casing means, (f) said spindle means being operable during a portion of each revolution of the rotation of said housing means to dynamically seal off a portion of said fluid so that the pressure in said portion of the fluid and on said spindle means increases thereby causing a pulse of fluid to flow through said passage means to said tool.

6. Apparatus connected to a tool and for driving said tool by fluid impulses, said apparatus comprising (a) a stationary casing means, (b) housing means rotatable within said casing means, adapted to contain a fluid and secured to said casing means, (c) spindle means rotatably mounted in said housing means and in said fluid, (d) through blade-type means carried by said spindle means and engageable with said housing means, one of said housing means and said through blade-type means being provided with gating means for controlling said application of the predetermined torque, said housing means being provided with passage means in communication with said fluid, extending through said housing means and connected to said tool, (e) and drive means connected to said spindle means for rotating said spindle means with respect to said housing means and said casing means, (f) said spindle means being operable during a portion of each revolution of the rotation of said spindle means to dynamically seal off a portion of said fluid so that the pressure in said portion of the fluid and on said spindle means increases thereby causing a pulse of fluid to flow through said passage means to said tool.

References Cited by the Examiner

UNITED STATES PATENTS

| | | | |
|---|---|---|---|
| 887,781 | 5/1908 | Fischer | 192—58 |
| 952,433 | 3/1910 | Levavasseur | 192—58 |
| 1,099,161 | 6/1914 | Brown | 192—58 |
| 1,296,769 | 3/1919 | Cooke | 64—26 |
| 1,529,061 | 3/1925 | Gordon | 192—58 |
| 1,816,735 | 7/1931 | Magness et al. | 192—58 X |
| 2,050,955 | 8/1936 | Lee | 192—58 X |
| 2,514,521 | 7/1950 | Shaff | 103—137 |
| 2,564,212 | 8/1951 | Ramsey | 192—58 |
| 2,565,289 | 8/1951 | Zak | 64—28 |
| 2,633,216 | 3/1953 | Zak | 64—26 X |
| 2,676,464 | 4/1954 | Warren | 60—54.5 |
| 2,821,840 | 2/1958 | Hays | 60—54.5 |
| 2,986,024 | 5/1961 | Power | 64—26 |
| 2,116,617 | 1/1964 | Skoog | 64—24 |
| 3,210,961 | 10/1965 | Skoog et al. | 64—26 |

MARTIN P. SCHWADRON, *Primary Examiner.*

ROBERT R. BUNEVICH, *Examiner.*